(12) United States Patent
Moyer

(10) Patent No.: US 7,962,718 B2
(45) Date of Patent: *Jun. 14, 2011

(54) METHODS FOR PERFORMING EXTENDED TABLE LOOKUPS USING SIMD VECTOR PERMUTATION INSTRUCTIONS THAT SUPPORT OUT-OF-RANGE INDEX VALUES

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 811 days.

This patent is subject to a terminal disclaimer.

(21) Appl. No.: 11/871,668

(22) Filed: Oct. 12, 2007

(65) Prior Publication Data

US 2009/0100253 A1    Apr. 16, 2009

(51) Int. Cl.
G06F 15/80    (2006.01)
G06F 9/30    (2006.01)
(52) U.S. Cl. .......................................... 712/22; 712/220
(58) Field of Classification Search .................... 712/22, 712/225, 300
See application file for complete search history.

(56) References Cited

U.S. PATENT DOCUMENTS

| | | | |
|---|---|---|---|
| 5,935,235 A | 8/1999 | Angle et al. | |
| 6,223,320 B1 | 4/2001 | Dubey et al. | |
| 6,446,198 B1 | 9/2002 | Sazegari | |
| 6,958,718 B2 | 10/2005 | Symes et al. | |
| 7,000,099 B2 | 2/2006 | Sazegari | |
| 7,043,627 B2 | 5/2006 | Shimizu et al. | |
| 7,161,690 B1* | 1/2007 | Bhaskar | 358/1.1 |
| 7,174,014 B2* | 2/2007 | Lee et al. | 380/28 |
| 7,363,574 B1* | 4/2008 | Maitland et al. | 714/759 |
| 2004/0054877 A1* | 3/2004 | Macy et al. | 712/221 |
| 2005/0125639 A1* | 6/2005 | Symes et al. | 712/225 |
| 2005/0149541 A1 | 7/2005 | Sazegari | |
| 2006/0184765 A1* | 8/2006 | Krueger | 712/4 |
| 2009/0100247 A1 | 4/2009 | Moyer et al. | |

OTHER PUBLICATIONS

Non-Final Office Action mailed Jun. 4, 2010 for U.S. Appl. No. 11/871,659, 22 pages.

* cited by examiner

Primary Examiner — David J Huisman

(57) ABSTRACT

A permutation instruction generates vector elements for a destination register using identified source and destination registers. A plurality of partial table lookups corresponding to an extended table produces a plurality of intermediate results. At least one source register stores a plurality of index values corresponding to the extended table. Out-of-range index values are values that are not contained in at least one additional source register and result in a predetermined constant value being stored into a predetermined vector element of the destination register. The index values are adjusted between the partial table lookups. A final result is formed by performing a logic function with the plurality of intermediate results. The final result is thereby formed without a full table lookup of each element of the final result.

16 Claims, 7 Drawing Sheets

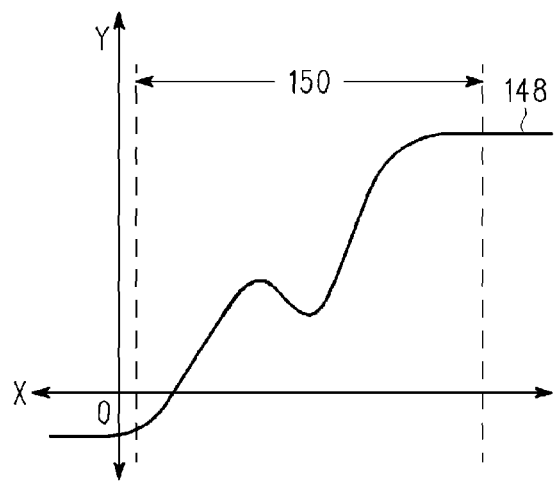
*FIG. 4*
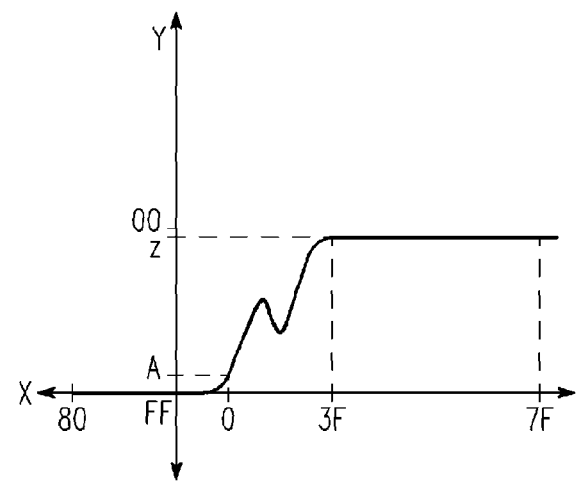
*FIG. 5*
| TABLE VALUES | FF ··· FF | A B C ··· Z | 00 ··· 00 |
|---|---|---|---|
| INDICES | 80 ··· FF | 0 1 2 ··· 3F | 40 ··· 7F |
IN RANGE
*FIG. 6*

LOOKUP TABLE VALUES

| | 0 | 1 | 2 | 3 | 4 | 5 | 6 | 7 |
|---|---|---|---|---|---|---|---|---|
| ENTRIES 0-7 | 18 | 24 | 38 | 42 | 49 | 56 | 99 | 64 |
| ENTRIES 8-F | 8 / 36 | 9 / 74 | A / 65 | B / 78 | C / 33 | D / 26 | E / 09 | F / 15 |
| ENTRIES 10-17 | 10 / 55 | 11 / 76 | 12 / 48 | 13 / 65 | 14 / 31 | 15 / 17 | 16 / 15 | 17 / 33 |
| ENTRIES 18-1F | 18 / 67 | 19 / 4 | 1A / 38 | 1B / 44 | 1C / 96 | 1D / 12 | 1E / 45 | 1F / 98 |
| ENTRIES 20-27 | 20 / 34 | 21 / 86 | 22 / 27 | 23 / 94 | 24 / 23 | 25 / 66 | 26 / 38 | 27 / 72 |
| ENTRIES 28-2F | 28 / 07 | 29 / 69 | 2A / 35 | 2B / 67 | 2C / 33 | 2D / 48 | 2E / 73 | 2F / 85 |
| ENTRIES 30-37 | 30 / 33 | 31 / 05 | 32 / 84 | 33 / 94 | 34 / 20 | 35 / 47 | 36 / 36 | 37 / 45 |
| ENTRIES 38-3F | 38 / 72 | 39 / 94 | 3A / 68 | 3B / 83 | 3C / 37 | 3D / 27 | 3E / 63 | 3F / 12 |

FIG. 10

| INITIAL INDEX VECTOR | 23 | 0D | 26 | 38 | 00 | 19 | 38 | 21 | 3E |
|---|---|---|---|---|---|---|---|---|---|

| FINAL RESULT VECTOR | 94 | 26 | 38 | 18 | 4 | 72 | 86 | 63 |
|---|---|---|---|---|---|---|---|---|

FIG. 11

INSTRUCTION #12 — LOAD R112, TABLE_ELEMENTS_20_27

| 34 | 86 | 27 | 94 | 23 | 66 | 38 | 72 | R112 |

INSTRUCTION #13 — LOAD R113, TABLE_ELEMENTS_28_2F

| 07 | 69 | 35 | 67 | 33 | 48 | 73 | 85 | R113 |

INSTRUCTION #14 — VPERM2 R115, R112, R113

| 94 | 0 | 38 | 0 | 0 | 0 | 86 | 0 | R115 |

INSTRUCTION #15 — OR R114, R114, R115

| 94 | 26 | 38 | 18 | 4 | 0 | 86 | 0 | R114 |

INSTRUCTION #16 — VSUBI.B R115, R111, #0x30

| F3 | DD | F6 | D0 | E9 | 08 | F1 | 0E | R115 |

INSTRUCTION #17 — LOAD R112, TABLE_ELEMENTS_30_37

| 33 | 05 | 84 | 94 | 20 | 47 | 36 | 45 | R112 |

INSTRUCTION #18 — LOAD R113, TABLE_ELEMENTS_38_3F

| 72 | 94 | 68 | 83 | 37 | 27 | 63 | 312 | R113 |

INSTRUCTION #19 — VPERM2 R115, R112, R113

| 0 | 0 | 0 | 0 | 0 | 72 | 0 | 63 | R115 |

INSTRUCTION #20 — OR R114, R114, R115

| 94 | 26 | 38 | 18 | 4 | 72 | 86 | 63 | R114 |

FINAL RESULTS

*FIG. 13*

METHODS FOR PERFORMING EXTENDED TABLE LOOKUPS USING SIMD VECTOR PERMUTATION INSTRUCTIONS THAT SUPPORT OUT-OF-RANGE INDEX VALUES

CROSS-REFERENCE TO RELATED APPLICATION(S)

This application is related to U.S. patent application Ser. No. 11/871,659, filed on Oct. 12, 2007, entitled "SIMD Permutations With Extended Range In A Data Processor" naming William C. Moyer, Imran Ahmed and Dan Tamir as inventors, and assigned to the current assignee hereof.

BACKGROUND

1. Field

This disclosure relates generally to data processors, and more specifically, to data processors that execute instructions which create permutation values.

2. Related Art

Increased performance in data processing systems can be achieved by allowing parallel execution of operations on multiple elements of a vector. One type of processor available today is a vector processor which utilizes vector registers for performing vector operations. However, vector processors, while allowing for higher performance, also have increased complexity and cost as compared with processors using scalar general purpose registers. That is, a vector register file within vector processors typically includes N vector registers, where each vector register includes a bank of M registers for holding M elements. Another type of known processor is a single-instruction multiple-data (SIMD) scalar processor (also referred to as a "short-vector machine") which allows for limited vector processing while using any existing scalar general purpose register (GPR). Therefore, although the number of elements per operation is limited as compared to vector processors, reduced hardware is required. However, in current SIMD scalar processors, there is a large overhead associated with transfers of vector elements to the scalar registers for execution and the transfers of multiple vector elements back to memory. The overhead limits the effective throughput of operations as loading and storing multiple vector elements between memory and registers limits the throughput. SIMD scalar processors typically execute vector permute instructions in which a permutation value is generated. Such instructions require a significant overhead to execute because constant values are inserted and memory table lookup operations are often required to provide the desired constant values. Additional processing results from the fact that the memory table size often does not match the number of vector elements in a single vector. Additionally, the number of data storage registers that can be devoted to holding portions of a constant value table for vector processing is limited. These factors limit the usefulness and efficiency of the use of permutation instructions for performing vector table lookup operations.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 4 illustrates in graphical form a function plotted with respect to a two-dimensional axis;

FIG. 5 illustrates in graphical form a normalization of the function of FIG. 4;

FIG. 6 illustrates in table form a correlation between index values and look-up table values for the predetermined function of FIG. 5;

FIG. 10 illustrates in tabular form a memory lookup table having indexed entries and stored values at each entry;

FIG. 11 illustrates in diagram form an initial index vector for use in performing a table lookup and a final result vector upon completion of the table lookup; and FIGS. 12 and 13 illustrate a plurality of sequentially executed data processing instructions to perform an extended memory table lookup.

DETAILED DESCRIPTION

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
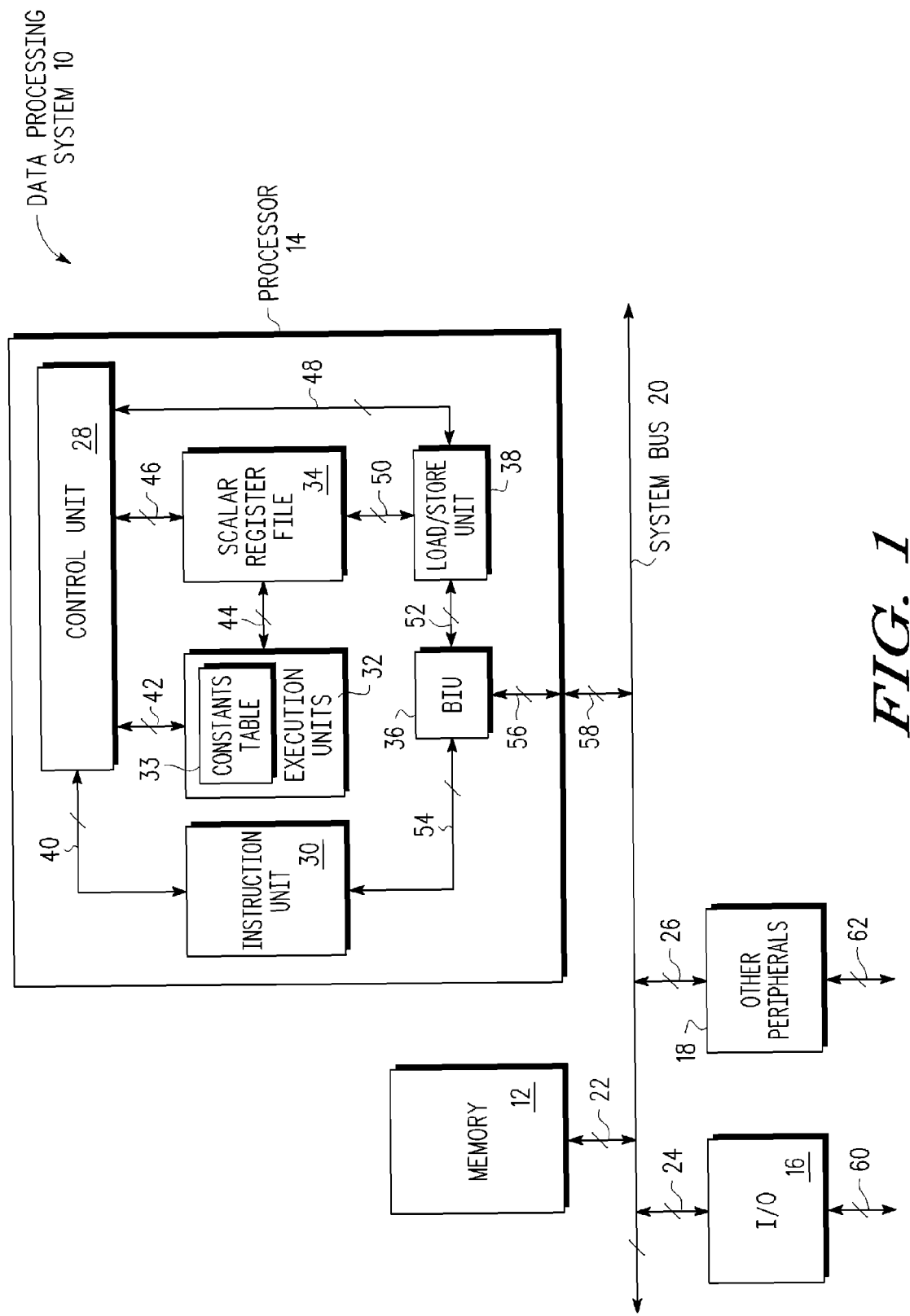
FIG. 1 illustrates in block diagram form a SIMD data processor in accordance with one form of the present invention.

FIG. 1 illustrates, in block diagram form, a data processing system 10 in accordance with one embodiment of the present invention. Data processing system 10 includes a memory 12, a processor 14, an input/output (I/O) 16, other peripherals 18 and a system bus 20. Memory 12 is bidirectionally coupled to system bus 20 via conductors 22. I/O 16 is bidirectionally coupled to system bus 20 via conductors 24, the other peripherals 18 are bidirectionally coupled to system bus 20 via conductors 26, and processor 14 is bidirectionally coupled to system bus 20 via conductors 58. In one embodiment, the other peripherals 18 may include one or more peripherals, where each can be any type of peripheral, such as a universal asynchronous receiver transmitter (UART), a real time clock (RTC), a keyboard controller, other memories, etc. Some or all of the other peripherals 18 may be capable of communicating information external to data processing system 10 via conductors 62. I/O 16 may include any type of I/O circuitry which receives or provides information external to data processing system 10, via, for example, conductors 60. Memory 12 can be any type of memory, such as, for example, a read only memory (ROM), a random access memory (RAM), non-volatile memory (e.g. Flash), etc. Data processing system 10 may include elements other than those illustrated, or may include more or fewer elements than those illustrated. For example, data processing system 10 may include any number of memories or processors.

Processor 14 may be any type of processor, such as, for example, a microprocessor, microcontroller, digital signal processor, etc. In one embodiment, processor 14 may be referred to as a processor core. In another embodiment, processor 14 may be one of many processors in a multi-processor data processing system. Furthermore, although not illustrated as such, processor 14 may be a pipelined processor. In the embodiment illustrated in FIG. 1, processor 14 includes a control unit 28, an instruction unit 30, execution units 32 which include a constants table 33, a scalar register file 34, a bus interface unit (BIU) 36, and a load/store unit 38. Control unit 28 is bidirectionally coupled to instruction unit 30 via conductors 40, to execution units 32 via conductors 42, to scalar register file 34 via conductors 46, and to load/store unit 38 via conductors 48. Execution units 32 are bidirectionally coupled to scalar register file 34 via conductors 44, and scalar register file 34 is bidirectionally coupled to load/store unit 38 via conductors 50. BIU 36 is bidirectionally coupled to instruction unit 30 via conductors 54 and to load/store unit 38 via conductors 52. Processor 14 is capable of bidirectionally communicating with system bus 20 via conductors 56 which are coupled to conductors 58. Note that processor 14 may include more circuitry than that illustrated, where the additional circuitry may also be coupled to conductors 58. That is, conductors 56 may communicate with system bus 20 via all or a portion of conductors 58. Note also that all or a portion of processor 14 may be referred to as processing circuitry.

In operation, instruction unit 30 fetches instructions from a memory, such as memory 12, via BIU 36 and system bus 20, and receives and provides control information from and to control unit 28. Instruction unit 30 can be any type of instruction unit as known in the art, and operates as known in the art, and therefore will not be described in more detail herein. Instruction unit 30 therefore provides instructions to control unit 28 which controls execution of these received instructions via, for example, execution units 32 and load/store unit 38, which are both capable of communicating with scalar register file 34, as needed, directly or via control unit 28. For example, control unit 28, via load/store unit 38 and BIU 36, is capable of loading data from memory (such as memory 12) to registers within scalar register file 34 as needed for executing instructions and is capable of storing data from registers within scalar register file 34 to memory (such as memory 12) as needed for executing instructions. For example, in one embodiment, load/store unit 38 can communicate directly with scalar register file 34 (to read and write data) via conductors 50 based on control information provided from control unit 28 via conductors 48. Execution units 32 can perform arithmetic, logical, shifting, or other operations using data stored within scalar register file 34 and store results to registers within scalar register file 34, as required for executing the instructions received from instruction unit 30 by way of control unit 28. Execution units 32 may include, for example, arithmetic logic units (ALUs), floating point units, etc. The constants table 33 within the execution units 32 is a memory or storage device that stores a plurality of predetermined constant values that will be used for processing as will be described below.

Scalar register file 34 includes N general purpose registers (GPRs), where N can be any integer greater than or equal to one. In one embodiment, scalar register file 34 includes thirty-two 64-bit registers. As used herein, a scalar register indicates a register which has a one dimensional map and thus holds only one row of data (e.g. a 1 by M-bit register), where M can be any integer greater or equal to one. In one embodiment, M is 64, and each register is thus capable of storing a 64-bit quantity. Scalar register file 34 can provide or receive control information or data to or from control unit 28 via conductors 46.

Operation of processor 14 will not be described in more detail herein other than for those portions that are needed in understanding the various embodiments described herein. Also note that existing designs for data processing systems having operands stored in a scalar general purpose register file can be modified as needed to execute the vector permutation instructions described here. Furthermore, note that since scalar register files may be used, currently existing designs may be retrofitted to allow for the instructions to be described herein. (However, note that the embodiments described herein may be used with any type of register file and is not limited to only scalar register files.)

Figures 2, 3:
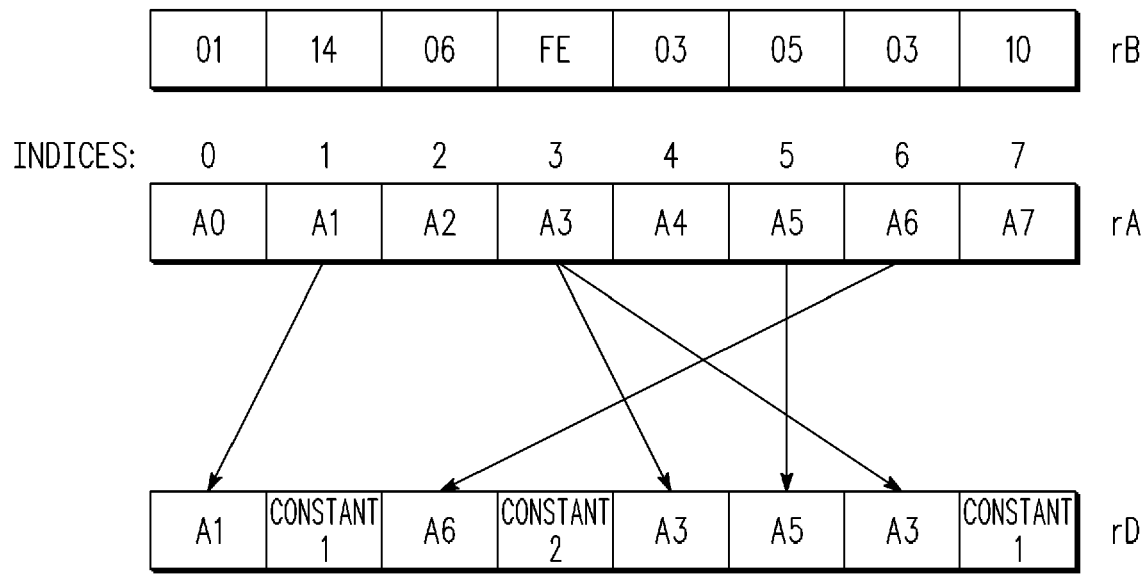
FIG. 2 illustrates a first form of a vector permutation instruction for execution by the SIMD data processor of FIG. 1.
FIG. 3 illustrates in block diagram form a portion of general purpose registers of the scaler register file of the data processor of FIG. 1 and associated data flow in response to the execution of the instruction of FIG. 2.

Illustrated in FIG. 2 is one form of a vector permutation instruction labeled "VPERM rD, rA, rB". In the illustrated form the vector permutation instruction is a thirty-two bit instruction having five predetermined fields. Other bit length instructions may be implemented and the bit size of each instruction field is implementation specific. An opcode field identifies the function or type of instruction. Therefore the opcode field of this instruction identifies the instruction as a vector permutation instruction. A vector permutation instruction performs a permutation or a change in the order of bits within a register of a vector register file. A second field within the instruction is a destination register identifier labeled "rD" that identifies a register D. A third field within the instruction is a register identifier labeled "rA" that identifies a register A. A fourth field within the instruction is a register identifier labeled "rB" that identifies a register B. The destination register is sourced by using both register "rA" and register "rB". The instruction concludes with a fifth field that is a subopcode field. The subopcode field further specifies how the registers are used to implement the function specified by the opcode field. It should be understood that in other embodiments additional fields or other fields may be implemented. Further, the ordering of the fields rD, rA and rB may be changed to other sequences than the one as illustrated in FIG. 2.

Illustrated in FIG. 3 is a diagrammatic result of the execution of the vector permutation instruction of FIG. 2. Each of registers A, B and D have a plurality of vector elements of predetermined bit length. In one form each vector element of registers A, B and D are one byte in size. Other sizes may be used. Each of registers A and B are used on a vector element by vector element basis to determine the vector element values of the destination register D. In the illustrated form each vector element of register B contains a plurality of hex values used as element selector values. Each of the hex values refers to an index value into register A and directly correlates, on a vector element by vector element basis, to a vector element position in the destination register D. Register A functions, in part, as a source register to provide vector element values for the destination register D. For example, the first vector element position of register B contains the hex value of 01. The value 01 is used as an index value into register A whereby the vector element value A1 is stored. Therefore, the value A1 is placed in the first vector element of the destination register rD. The second vector element position within register B contains the hex value 14. This value is greater than the number of indices that define register A. Therefore, a predetermined constant value, Constant 1, which is correlated to the hex value 14, is placed into the second vector element position of destination register D. The value Constant 1 is retrieved from the constants table 33 of data processing system 10 of FIG. 1. The third vector element position within register B contains the hex value "06" which is one of the assigned index values into register A. Therefore, the value "A6" contained in the vector element position of register A that correlates to index 06 is placed into the third vector element position of destination register D. The fourth vector element position within register B contains the hex value "FE" which is not one of the assigned index values into register A. The value "FE" is correlated to a second constant value, Constant 2, and is placed in the fourth vector element position of destination register D. The value of Constant 2 is retrieved from constants table 33. The fifth vector element position within register B contains the hex value "03" which is one of the assigned index values into register A. Therefore, the value "A3" contained in the vector element position of register A that correlates to index 03 is placed into the fifth vector element position of destination register D. The sixth vector element position within register B contains the hex value "05" which is one of the assigned index values into register A. Therefore, the value A5 contained in the bit position of register A that correlates to index 05 is placed into the sixth vector element position of destination register D. The seventh vector element position within register B contains the hex value 03 which is one of the assigned index values into register A. Therefore, the value A3 contained in the vector element position of register A that correlates to index 03 is placed into the seventh vector element position of destination register D. The last or eighth vector element position within register B contains the hex value 10 which is not one of the assigned index values into register A. Therefore, a predetermined constant value, Constant 1, from the constants table 33 is placed in the eighth vector element position of destination register D. In this manner the control unit 28 of data processing system 10 through interaction with the execution units 32 and scalar register file 34 executes the vector permutation instruction of FIG. 2 to form a permutation value in destination register D using the vector element values of registers B and A.

When a vector element value contained in register B is out of range or is not one of the indices that are assigned to register A, any of numerous methods may be used to determine what constant within the constants table 33 should be used. For example, the logic value of a predetermined bit position of each vector element in register B that is not correlated to an index value of register A may be used to determine whether to select Constant 1 or Constant 2. In another form, each unassigned vector element may be compared to predetermined ranges of hex values to determine what constant value to select. It should be understood that any number of constant values may be used to form the permutation vector value of destination register D.

In one embodiment, rather than utilizing a constants table 33, Constant 1 may be a hardwired value of '00' hex, and Constant 2 may be a hardwired value of 'FF' hex. Alternate embodiments may choose alternate hardwired values for Constant 1 and Constant 2. In one embodiment, the predetermined bit position of each vector element in register B that is not correlated to an index value of register A that may be used to determine whether to select Constant 1 or Constant 2 may be the most-significant bit of the vector element. In this embodiment, when viewing the index values as signed numbers, a negative index value (which is always outside of the range of indices of the vector elements of register rA) may select a value of 'FF' hex, which corresponds to a constant value of −1, and a positive index value which is outside of the range of indices of the vector elements of rA may select a value of '00' hex, which corresponds to a constant value of 0. Alternate embodiments may choose other frequently encountered or beneficial constant values.

Illustrated in FIG. 4 is a function plotted with respect to a two-dimensional axis labeled X and Y. For purposes of explanation, the values of X and Y can be any quantities and the function is typical of many nonlinear functions. Within a range 150, the function is nonlinear. Outside of range 150, the function is substantially constant and linear such as within region 148.

Illustrated in FIG. 5 is a normalization of the function of FIG. 4. The normalization of the function conforms or reduces the illustrated function to a standard. In the illustrated form the primary portion of nonlinearity on the Y axis is from hex value A to hex value Z. The value on the Y axis corresponding to region 148 is represented by the hex value 00. The value on the X axis corresponding to region 148 is represented as extending from hex values 3F to 7F and beyond. The value on the X axis corresponding to the nonlinear portion of the function extends primarily from hex value 0 to 3F. The Y axis intersects the X axis at hex value FF and extends negatively to the left to value 80 and beyond. The normalization of the function of FIG. 4 results in compressing the function of FIG. 4 to a smaller set of values that are represented.

Illustrated in FIG. 6 is a correlation between index values and look-up table values for the normalized function of FIG. 5. The index values correspond to the values illustrated on the X axis of FIG. 5. The table values correspond to the values illustrated on the Y axis of FIG. 5. For example, the table value of A corresponds to the index value of 0. All illustrated values are in a hex format. As the index values increase up to 3F, the table values sequentially increase from A to Z. The first index value after 3F is 40 and corresponds to the normalized table value of 00. All index values from 40 to 7F have a corresponding table value of 00. The first index value that is less than 0 is FF which corresponds to the table value on the Y axis of FF. For all index values from FF to 80, the corresponding table value remains a constant of FF. Therefore, the FIG. 6 correlation values correspond directly to the FIG. 5 graph of the normalized function. It should be appreciated that the example that is provided in FIGS. 4-6 provides an exemplary function for use with the vector permutation instruction of FIG. 2. For example, the indices of 0 through 3F may be assigned to the vector elements of one or more registers such as register A, and are labeled as "in range", since these indices will correspond to a vector element which can be found in one or more registers during table lookup processing. The indices of 80 through FF may be assigned to Constant 1 and the indices of 40 through 7F may be assigned to Constant 2. Constant 1 therefore assumes the value of FF and Constant 2 assumes the value of 00. In this manner the execution of the FIG. 2 permutation instruction for the non-linear function of FIG. 4 results in a permutation value in a destination register having vector elements that correspond to each portion of the normalized function.

Figure 7:
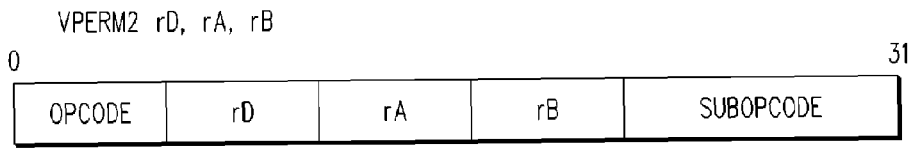
FIG. 7 illustrates in block diagram form a SIMD data processor in accordance with another form of the present invention.

Illustrated in FIG. 7 is an alternative form of a vector permutation instruction. In this form the vector permutation instruction is illustrated as having thirty-two bits having five predetermined fields. Other bit length instructions may be implemented and the bit size of each instruction field is implementation specific. An opcode field identifies the function or type of instruction. Therefore the opcode field of this instruction identifies the instruction as a vector permutation instruction. A second field within the instruction is a destination register identifier labeled "rD" that identifies a register D. A third field within the instruction is a register identifier labeled "rA" that identifies a register A. A fourth field within the instruction is a register identifier labeled "rB" that identifies a register B. The destination register is sourced by using both register "rA" and register "rB". The instruction concludes with a fifth field that is a subopcode field. The subopcode field further specifies how the registers are used to implement the function specified by the opcode field. It should be understood that in other embodiments additional fields may be implemented. Further, the ordering of the fields rD, rA and rB may be changed to other sequences than the field ordering illustrated in FIG. 7.

Figure 8:
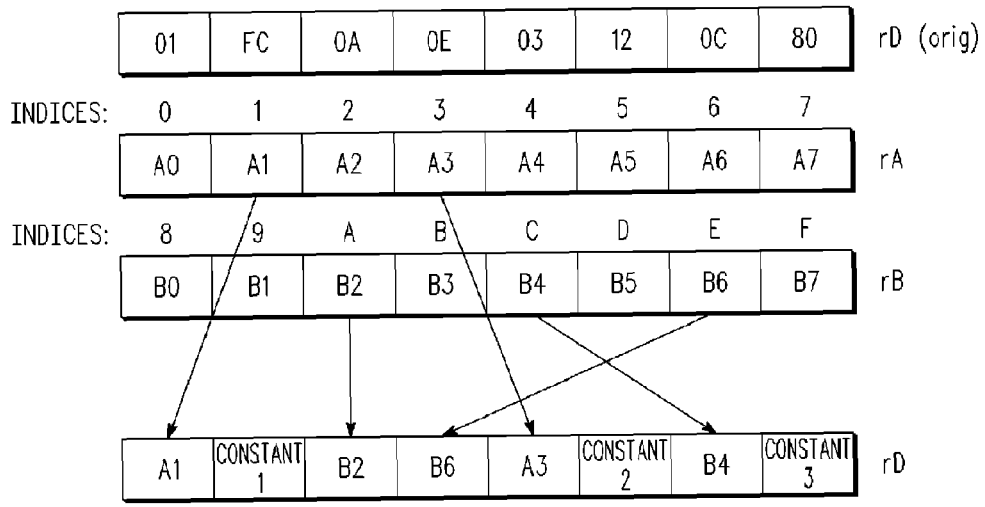
FIG. 8 illustrates in block diagram form a portion of general purpose registers of the scaler register file of the data processor of FIG. 1 and associated data flow in response to the execution of the instruction of FIG. 7.

Illustrated in FIG. 8 is a diagrammatic result of the execution of the vector permutation instruction of FIG. 7. Registers A, B and D store a plurality of vector elements of predetermined bit length. Destination register D is illustrated in both its original state and after execution of the vector permutation instruction. Prior to execution of the vector permutation instruction the contents of destination register D are stored in a temporary register (not shown). In one form each vector element of registers A, B and D is one byte in size. Other sizes may be used. The original values of each vector element within destination register D contain an index value that is used to index registers A and B. Each of registers A and B is used on a vector element by vector element basis to provide the vector element values of the destination register D. In the illustrated form each vector element of registers A and B contains a hex value. For example, the left-most or first vector element value of the original destination register rD contains the index value 1 which is the second vector element of register A. The next adjacent or second vector element of register A contains the hex value A1 which is placed in the first vector element of destination register D. The second vector element of the original destination register D contains the index value FC which is out of range of the indices used to index registers A and B. Therefore, the value of Constant 1 is placed into the second vector element of destination register D. The next adjacent or third vector element of the original destination register D contains the index value 0A which is assigned to the index value for the third from the left vector element of register B. Therefore, the vector element value of B2 found in the vector element of register B that is indexed by A is placed into the corresponding third vector element of register D. The next adjacent or fourth vector element of the original destination register D contains the index value 0E which is assigned to the index value for the seventh from the left vector element of register B. Therefore, the vector element value of B6 found in the vector element of register B that is indexed by E is placed into the corresponding fourth vector element of register D. The next adjacent or fifth vector element of the original destination register D contains the index value 03 which is assigned to the index value for the fourth from the left vector element of register A. Therefore, the vector element value of A3 found in the vector element of register A that is indexed by 03 is placed into the corresponding fifth vector element of register D. The next adjacent or sixth vector element of the original destination register D contains the index value "12" which is out of range meaning that no index value corresponding to the vector elements of registers A and B have a value of "12". Therefore, a second constant value, Constant 2, is placed into the sixth vector element of destination register D.

The next adjacent or seventh vector element of the original destination register D contains the index value "OC" or "C" which is assigned to the index value for the fifth from the left vector element of register B. Therefore, the vector element value of B4 found in the vector element of register B that is indexed by "C" is placed into the corresponding seventh vector element of register D. The next adjacent or eighth vector element of the original destination register D contains the index value "80" which is out of range meaning that no index value corresponding to the vector elements of registers A and B have a value of "80". Therefore, a third constant value, Constant 3, is placed into the eighth vector element of destination register D. The values for Constant 1, Constant 2 and Constant 3 may be determined by any of numerous methods. For example, the value of the vector element contained in the original destination register D can be used to determine what constant value is used. In one form a range of vector element values may be assigned to a predetermined constant value. In other forms, a binary value of a predetermined bit or bits of the vector element value may be used to determine what constant value is used for Constant 1, Constant 2 and Constant 3. Other criteria may also be readily determined. Thus at the conclusion of execution of the vector permutation instruction of FIG. 7 there is formed a permutation value that is stored in the destination register D.

Figure 9:
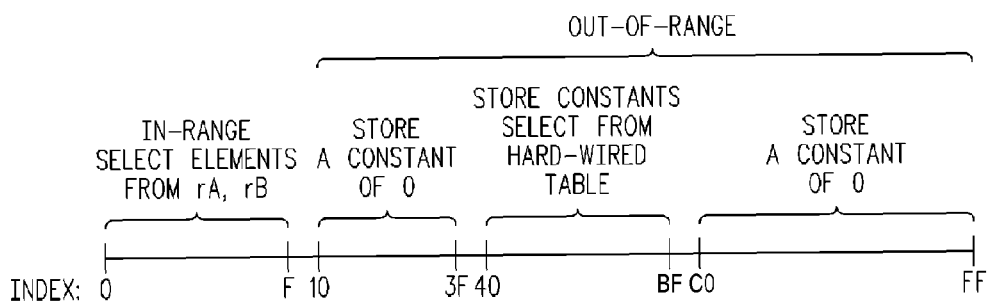
FIG. 9 illustrates in graphical form how to populate the destination register of FIG. 8 based on index values of the select register of FIG. 8.

Illustrated in FIG. 9 is a graph illustrating how to populate the destination register of FIG. 8 based on index values of the select register of FIG. 8. Index values ranging in hex values from 0 to FF are sequentially provided on a horizontal axis. The values of 0 to F are illustrated as being in-range meaning that there are enough vector elements of source registers, such as registers A and B, to assign to those indices. For all of the indices in the range of hex values of 10 to FF there are no additional vector elements of source registers A and B to be assigned to. Therefore, any index hex value of 10 through FF, is out-of-range because none of these index values is assigned to a vector element of one of the sourcing registers, registers A and B. In the illustrated form those index values that are within a range of hex values of 10 to 3F cause a constant of 0 to be stored for a specific vector element corresponding to the index value. For index values that are within a range of hex values of 40 through BF, a constant is selected from a hard-wired memory table within constants table 33 for storage in a respective vector element of register D. A hard-wired memory table, in one form, is a memory that uses conductors to provide a predetermined constant value for a predetermined received index value. For index values that are within a range of hex values of C0 through FF a constant of 0 is stored for a specific vector element corresponding to the index value. Thus it should be apparent that any number of constant values may be used, that various methods may be used to determine the actual value of the constant and that various values may be used as the constant value.

Illustrated in FIG. 10 is a memory look-up table that is contained within the memory 12 of data processing system 10. The memory look-up table is used to retrieve the table values of FIG. 6 corresponding to respective indices that are in-range because corresponding values exist in memory. Entries having indices with hex values of 0 through 3F are located in the look-up table within memory 12, and will be loaded into one or more vector registers during table lookup processing. These entries will thus be available for selection by an in-range index. In the illustrated form there are eight sequentially numbered entries per line. Each entry has stored an arbitrary value. The format of the values in the memory look-up table and the values themselves may assume any format and value and the operation described herein is analogous. For purposes of explanation, those entry values in the memory look-up table which are desired to be retrieved and placed in a register in response to executing a vector permutation instruction are circled.

Illustrated in FIG. 11 are two exemplary vectors. Assume for explanation purposes that an initial index vector is generated or provided by a user. The initial index vector has a plurality of vector elements. In the illustrated form eight vector elements are provided but it should be understood that other numbers of vector elements may be used. Each vector element in the index vector contains a predetermined index value. Using the initial index vector, a table lookup of the memory table of FIG. 10 can be performed to form a final result vector. The final result vector contains a plurality of vector elements, each of which contains a value corresponding to a correlated index value in the index vector. For example the first vector element of the index vector contains the index value of 23. When the value of 23 is indexed in the lookup table of FIG. 10 the circled value of 94 may be found. Accordingly, the value of 94 is stored in the first vector element of the final result vector. Similarly, the index value of 0D or D in the lookup table of FIG. 10 is the location of the value 26. All of the remaining values of the final result vector are similarly formed and will not be discussed in detail. A typical process to form the final result vector involves the sequential addressing of the lookup table and the sequential retrieving of each value corresponding to the vector elements of the final result vector. However, such processes are very time consuming and frequently burden other circuitry and processes in the data processing system 10. Therefore, an extended table lookup method may be implemented using a vector permutation instruction to significantly enhance the time required to form a final result vector by using a lookup table.

Figure 12:
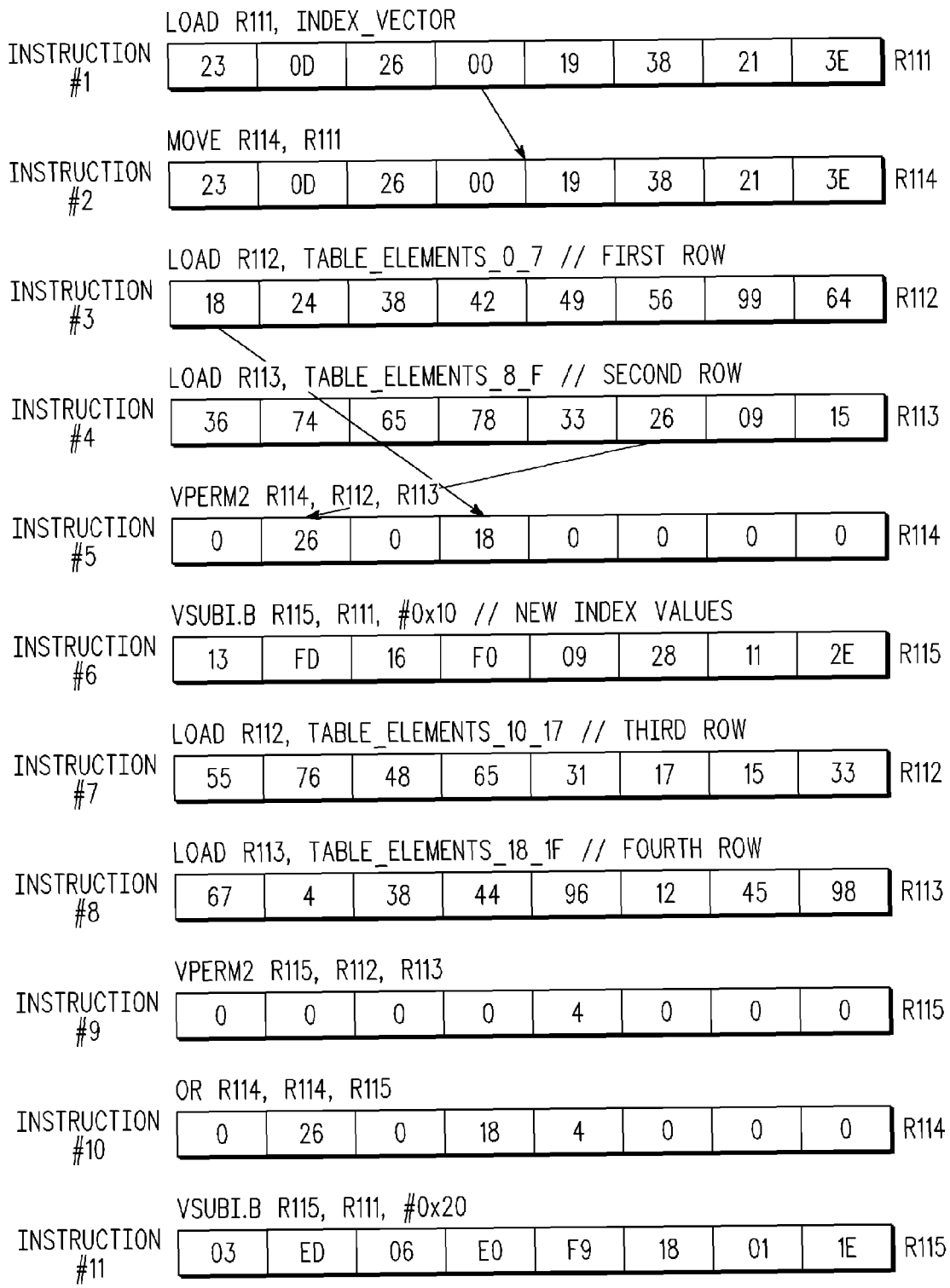

Illustrated in FIGS. 12 and 13 is a plurality of data processing instructions that provided a plurality of vector values that are stored in a memory or storage table, such as the memory look-up table of FIG. 10, and which respectively correspond to a plurality of index values. For purposes of illustration, the values provided in FIGS. 12 and 13 are correlated to the values of the memory lookup table of FIG. 10. A first data processing instruction provides a plurality of index values. A plurality of data processing instructions are executed so that in a last processing step storage circuitry will contain data values from the storage table that respectively correspond to the plurality of index values. This operation can be implemented with a series of full table lookups for each individual index value. However, such a full table lookup is a slow operation because the index values are not sequential and may be contained at various locations in the table. As a result, significant processing delays may be encountered to form the final results having vector data from the table.

In contrast, there is described in FIGS. 12 and 13 a method to implement the retrieval of all of the vector data without performing a series of full table lookups for each index value. The method described herein and variations thereof perform a series of partial table lookups to implement an extended table lookup. The extended table lookup is a lookup which is iterative and partial but which extends the partial nature of these lookups to the full table. Thus the term extended table lookup is used. The data processing instructions in FIGS. 12 and 13 are vector instructions and may be implemented in various data processing systems having a plurality of general purpose registers, including data processing system 10 of FIG. 1. The instructions may have any of various predetermined bit sizes and may have any predetermined number of vector fields. A first data processing instruction that is executed is a load instruction that loads an initial index vector in a register 111, R111. When using data processing system 10, register 111 is one of a plurality of general purpose registers within the scalar register file 34. The vector instruction number 1 loads a plurality of vector fields into register 111, each containing a vector value in hexadecimal form. A second data processing instruction is a move instruction and is a command to move the contents of register 111 to a register 114. A third data processing instruction is a load instruction and identifies a register 112 as the register to be loaded. The load instruction specifies that elements zero through seven of a first row of a table of stored values is to be stored in register 112. In this example, the first row of values corresponds to entries 0-7 of the table shown in FIG. 10. A fourth data processing instruction is also a load instruction and identifies a register 113 as the register to be loaded. Instruction number 4 specifies that elements 8 through F of a second row of the table of stored values is to be stored in register 113. Thus register 113 is shown being loaded with the second row of table values from the table of FIG. 10. A fifth data processing instruction is a vector permutation instruction and is the second form of permutation instruction illustrated in FIG. 7 and previously discussed. Therefore the instruction "VPERM2 R114, R112, R113" is executed by using registers 112 and 113 as vector source registers to provide vector values to a destination register 114. The values that are placed into each byte position of the destination register 114 are determined by the vector index values which were originally stored in register 111 and then copied to register 114 by the second data processing instruction. The original values of the destination register 114 form the index values, and are stored in a temporary register (not shown) during processing of the VPERM2 instruction (data processing instruction five) since destination register 114 is overwritten with the selected vector elements. For example, the first vector element byte value in hexadecimal form in the temporary copy of register 114 is "23". This value is out of range meaning that its value exceeds the total number of stored values in registers 112 and 113 which are the vector source registers. For the VPERM2 instruction a single default value of 0 is used for all out of range values. Therefore the value of 0 is placed in the first byte position of destination register 114. By way of further example, the second byte position of the temporary copy of the index vector register 114 stores the hexadecimal value of "0D". This value corresponds to the sixth byte position of register 113 in a manner analogous to the sixth byte position of register rB of FIG. 8. The hexadecimal value "26" is therefore stored in the second byte position of the destination register 114. Similarly, the fourth byte position of the temporary copy of the index vector register 114 stores the hexadecimal value of "00". This value corresponds to the first byte value in source register 112. The hexadecimal value "18" is therefore stored in the fourth byte position of the destination register 114. Similarly, the other byte position values of destination register 114 are determined and filled. Therefore a vector has been created and stored in register 114 as a result of execution instruction number 5.

A sixth data processing instruction is "VSUBI.B R115, R111, #0x10//New Index Values". This instruction's operation code (opcode) of VSUBI.B indicates that it is a Vector Subtraction Immediate—Byte Size instruction. Register 115 is specified by the instruction as the destination register. The immediate hexadecimal value of 10 is provided in the instruction as the value to be subtracted from each value in the vector element fields of register 111. The difference values which are stored in register 115 form new index values. By way of example, in the first vector field of register 111 the hexadecimal value of "23" exists. When the hexadecimal value of "10" is subtracted from "23", the value of "13" is placed in the first vector field, which is a byte in length, of register 115. In an analogous manner the remaining seven vector fields of register 115 are filled.

A seventh data processing instruction is "Load R12, Table_Elements_10_17//Third Row". The seventh data processing instruction is a load instruction. This instruction identifies register 112 as the register to be loaded and specifies that elements 10 through 17 (hexadecimal) of a third row of the table of stored values are to be stored in register 112. The values illustrated in each vector field of register 112 thus are the values that are present in the third row of the table of stored values corresponding to entries 10-17 of the lookup table of FIG. 10.

An eighth data processing instruction is "Load R113, Table_Elements_18_1F//Fourth Row". The eighth data processing instruction is also a load instruction. This instruction identifies register 113 as the register to be loaded and specifies that elements 18 through 1F of a fourth row of the table of stored values is to be stored in register 113. The values illustrated in each vector field of register 113 thus are the values that are present in the fourth row of the table of stored values corresponding to entries 18-1F of the lookup table of FIG. 10.

A ninth data processing instruction is another vector permutation instruction and also is the second form of permutation instruction illustrated in FIG. 7 and previously discussed. Therefore the instruction "VPERM2 R115, R112, R113" is executed by using registers 112 and 113 as vector source registers to provide vector values to destination register 115. The values that are in each byte position of the destination register 115 are determined by the new vector index values which were stored in register 115 as a result of the execution of data processing instruction six. The original value of the destination register 115 form the index values, and are stored in a temporary register (not shown) during processing of the VPERM2 instruction (data processing instruction 9) since destination register 115 is overwritten with the selected vector elements. For example, the first vector byte value in hexadecimal form in the temporary copy of register 115 is "13". This value is out-of-range meaning that its value exceeds the total number of stored values in registers 112 and 113 which are the vector source registers. For the VPERM2 instruction a single default value of "0" is used for all out-of-range values. Therefore the value of "0" is placed in the first byte position of destination register 115. By way of further example, the second byte position of the index vectors in the temporary copy of register 115 stores the hexadecimal value of "FD". This value is also out-of-range from the vector source registers. The value of "0" is therefore stored in the second byte position of the destination register 115. Similarly, all index values in all byte positions except the fifth byte position of the temporary copy of index vector register 115 are determined to be out-of-range. The fifth byte position of the temporary copy of index vector register 115 contains the value of "09" and this value is not out-of-range for the source registers R112 and R113. The vector field assigned to the number "09" is the vector field in register 113 which is the second-most from the left consistent with the numbering nomenclature illustrated for the two vector sourcing registers in FIG. 8. The hexadecimal value "4" is therefore stored in the fifth byte position from the left of the destination register 115. Therefore a vector has been created and stored in register 115 as a result of execution instruction number nine.

A tenth data processing instruction is a logic OR instruction and directs that the contents of register 114 be logically 'OR'ed with the contents of register 115 and the result placed into register 114. To implement the tenth data processing instruction, each vector field of register 114 is logically 'OR'ed with a corresponding vector field of register 115. When a corresponding pair of vector fields both contain the value "0", that vector field of the new register 114 also contains a "0". When only one vector field of a corresponding pair of vector fields contains the value "0", that vector field of the new register 114 will contain the value in the non-zero vector field within such pair. None of the corresponding pairs of vector fields are both non-zero, but if such were the situation then the largest hexadecimal value would be selected to put into the corresponding vector field of the new register 114. The values present in register 114 associated with the execution of data processing instruction ten thus represent a logical OR of the original values of registers 114 and 115.

An eleventh data processing instruction is "VSUBI.B R115, R111, #0x20". This instruction's operation code (opcode) of VSUBI.B indicates that it is a Vector Subtraction Immediate—Byte Size instruction. Register 115 is specified by the instruction as the destination register. The immediate hexadecimal value of 20 is provided in the instruction as the value to be subtracted from each value in the vector fields of register 111. The difference values which are stored in register 115 will become new index values. By way of example, in the first vector field of register 111 the hexadecimal value of 23 exists. When the hexadecimal value of 20 is subtracted from 23, the value of 03 is placed in the first vector field, which is a byte in length, of register 115. In the second vector field the value of 20 is subtracted from 0D to form the value of ED. In an analogous manner the remaining six vector fields of register 115 are filled.

FIG. 13 illustrates a continuation of data processing instructions which implement a vector permutation using table lookups in which the table is being extended in an efficient manner. A twelfth data processing instruction is a load instruction and is "Load R112, Table_Elements_20_27". This instruction is a command to load the eight table element values in byte positions 20 through 27 into register 112. Thus the values illustrated in the vector byte positions of register 112 in FIG. 13 represent the values which were present in the identified addressable elements of the table corresponding to entries 20-27 of the lookup table of FIG. 10.

A thirteenth data processing instruction is a load instruction and is "Load R113, Table_Elements_28_2F". This instruction is a command to load the eight table element values in byte positions 28 through 2F into register 113. Thus the values illustrated in the vector byte positions of register 113 represent the values which were present in the identified addressable elements of the table corresponding to entries 28-2F of the lookup table of FIG. 10.

A fourteenth data processing instruction is the second form of the vector permutation instruction illustrated in FIG. 7 and is "VPERM2 R115, R112, R113". As with data processing instruction nine, the instruction is executed by using registers 112 and 113 as vector source registers to provide vector values to destination register 115. The values that are in each byte position of the destination register 115 are determined by the new vector index values which were stored in register 115 as a result of the execution of data processing instruction eleven. The original values of the destination register 115 form the index values, and are stored in a temporary register (not shown) during processing of the VPERM2 instruction (data processing instruction 14) since destination register 115 is overwritten with the selected vector elements. For example, the left-most or first vector byte value in hexadecimal form in register 115 is "03" after execution of data processing instruction eleven. Thus the fourth (from the left) value in register 112 that corresponds to "03" is identified as the value "94" and is placed in the first vector field of register 115. The second vector byte value in the temporary copy of register 115 is "ED" and is out-of-range since that value exceeds the total number of assigned values in the source registers 112 and 113. For the VPERM2 instruction a single default value of "0" is used for all out-of-range values. Therefore the value of "0" is placed in the second byte position from the left of destination register 115. By way of further example, the third byte position of the index vectors in the temporary copy of register 115 stores the hexadecimal value of "06". This value corresponds to the seventh vector field from the left of source register 112. That vector field holds the value of "38" which is placed in the third byte position from the left of destination register 115. All remaining byte positions of the temporary copy of register 115 except the next-to-last contained out-of-range values and thus have the constant value of "0" put into those byte positions for the newly formed permutation value. The next-to-last vector field contained the value of "01" corresponding to the second-from-the-left vector field of source register R112. Thus the value of "86" is placed into the next-to-last vector field of destination register 115. Therefore a vector has been created and stored in destination register 115 as a result of execution instruction number fourteen.

A fifteenth data processing instruction is a logical OR operation and has the format of "OR R114, R114, R115". When the fifteenth data processing instruction is executed, a logical OR operation of the contents of register 114 and register 115 is performed and stored in register 114. The resulting values in each vector field of register 114 are illustrated in FIG. 13. Correlated or corresponding first, second, third, etc. vector fields of each register are logically ORed. When a specific vector field of one of the specified registers 114 and 115 has a zero value and the corresponding vector field of the other register is a non-zero value, the non-zero value is stored in that corresponding vector field of the destination register 114. When both of correlated vector fields of the specified registers 114 and 115 have zero values, the value of zero is stored in that corresponding vector field of the destination register 114. After the OR operation is performed, only two byte-size vector fields in instruction fifteen contain a zero value.

A sixteenth data processing instruction is "VSUBI.B R115, R111, #0x30". This instruction's operation code (opcode) of VSUBI.B indicates that it is a Vector Subtraction Immediate—Byte Size instruction. Register 115 is specified by the instruction as the destination register. The immediate hexadecimal value of "30" is provided in the instruction as the value to be subtracted from each value in the vector fields of register 111. The difference values which are stored in register 115 will become new index values. By way of example, in the first vector field of register 111 the hexadecimal value of "23" exists. When the hexadecimal value of 30 is subtracted from "23", the negative hexadecimal value of F3 is placed in the first vector field, which is a byte in length, of register 115. In the second vector field the value of "30" is subtracted from 0D to form the value of DD. In an analogous manner the remaining six vector fields of register 115 are filled.

A seventeenth data processing instruction is a load instruction and is "Load R112, Table_Elements_30_37". This instruction is a command to load the eight table element values in byte positions 30 through 37 into register 112. Thus the values illustrated in the vector byte positions of register 112 in FIG. 13 represent the values which were present in the identified addressable elements of the table corresponding to entries 30-37 of the lookup table of FIG. 10.

An eighteenth data processing instruction is also a load instruction and is "Load R113, Table_Elements_38_3F". This instruction is a command to load the eight table element values in byte positions 38 through 3F into register 113. Thus the values illustrated in the vector byte positions of register 113 in FIG. 13 represent the values which were present in the identified addressable elements of the table corresponding to entries 38-3F of the lookup table of FIG. 10.

A nineteenth data processing instruction is a vector permutation instruction. The instruction is the second form of the vector permutation instruction illustrated in FIG. 7 and is "VPERM2 R115, R112, R113". As with data processing instructions nine and fourteen, the instruction is executed by using registers 112 and 113 as vector source registers to provide vector values to destination register 115. The values that are in each byte position of the destination register 115 are determined by the new vector index values which were stored in register 115 as a result of the execution of instruction sixteen. The original values of the destination register 115 form the index values, and are stored in a temporary register (not shown) during processing of the VPERM2 instruction (data processing instruction 19) since destination register 115 is overwritten with the selected vector elements. For example, the left-most or first vector byte value in hexadecimal form in register 115 is "F3" after execution of data processing instruction sixteen. This value is out-of-range of the number of corresponding vector fields that exist within registers 112 and 113 and thus a default constant of "0" is placed in the first vector field of destination register 115. In a similar manner the remaining vector fields are determined and filled with values. Only two of the index values in the temporary copy of index register 115 contained index values that were not out-of-range. For those index values that are in-range the vector values are provided from register 113. Therefore a vector is created and stored in destination register 115 as a result of the execution of instruction number nineteen.

A twentieth data processing instruction is a logical OR operation and has the format of "OR R114, R114, R115". When the twentieth data processing instruction is executed a logical OR operation of the contents of register 114 and register 115 is performed and stored in register 114. The resulting values in each vector field of register 114 are illustrated in FIG. 13. At this point in the processing all of the in range vector indices have been processed, corresponding to entries 0-3F of the lookup table shown in FIG. 10. Thus an extended vector table lookup operation has been performed in a relatively few number of data processing instructions and using a small number of table entries. The contents of register 114 now represent the Final Results of an extended table lookup operation implemented by performing a sequence of vector permutation operations. Any storage circuitry, including register 114, may be used to store the Final Results. By way of a check of the correctness of the Final Results, one can readily compare each of the vector field Final Results with the lookup table of FIG. 10. For example, the first vector field of register 114 holds the value of "94" corresponding to the index value of 23. Referring back to FIG. 10 it can be readily seen that for the index value of 23 the value of "94" is stored as indicated by a circle. All other data values which were retrieved from the lookup table of FIG. 10 are circled and can be readily correlated between the index values in register 111 and the Final Results in register 114. Thus an efficient table lookup method has been provided that accurately provides vector data values stored in a memory lookup table without addressing the entire lookup table on an index-by-index value basis.

Note that an alternate embodiment of the VPERM2 instruction illustrated in FIG. 8 and utilized in the extended table lookup procedure illustrated in FIGS. 12-13 could provide an out-of-range constant value of "FF" hexadecimal for the result of each out-of-range index lookup instead of the constant value "00" hexadecimal. In the flow illustrated in FIGS. 12-13, execution of data processing instructions five, nine, fourteen and nineteen in this embodiment would result in values of "FF" being placed in elements of the destination register corresponding to respective out-of-range index values originally present in the index vector elements. For example, the VPERM2 operation of data processing instruction five would have placed the hexadecimal value "FF" into the first, third, fifth, sixth, seventh and eighth destination register elements. The VPERM2 operation of data processing instruction nine would place the hexadecimal value of "FF" into the first, second, third, fourth, sixth, seventh and eighth destination register elements. The VPERM2 operation of data processing instruction fourteen would place the hexadecimal value "FF" into the second, fourth, fifth, sixth and eighth destination register elements. The VPERM2 operation of data processing instruction nineteen places the hexadecimal value "FF" into all but the sixth and eighth destination register elements. In this embodiment, the logical OR data processing instructions ten, fifteen and twenty are replaced with logical XNOR data processing instructions to perform an exclusive-NOR logical operation on the two source vectors to produce the destination vector. In this manner, when a specific vector field of one of the specified source registers has a value of "FF" hexadecimal, the corresponding vector field of the other register is stored in that corresponding vector field of the destination register after the XNOR operation is performed. When both of correlated vector fields of the specified source registers have the value "FF" hex, the value of "FF" is stored in that corresponding vector field of the destination register. The final result of the instruction flow of FIGS. 12-13 will reflect the proper Final Results from this embodiment. It should be appreciated depending upon the particular details and limitations of a given application, one method or the other (providing a constant value of "00" for out-of-range indices for the VPERM2 instruction and utilizing logical OR operations, or providing a constant value of "FF" hex for out-of-range indices for the VPERM2 instruction and utilizing logical XNOR operations) may provide for improved speed, area, or other benefit, and thus may be chosen as appropriate.

By now it should be appreciated that there has been provided efficient permutation data processing instructions for use in a data processing system having a plurality of general purpose registers. An efficient extended table lookup process may be used when executing data processing instructions to create a permutation value. In one form there is herein provided a data processing system having a plurality of general purpose registers. Processor circuitry executes one or more instructions. The one or more instructions include a permutation instruction which identifies a first source register from the plurality of general purpose registers, at least one other source register from the plurality of general purpose registers, and a destination register from the plurality of general purpose registers. The first source register stores at least one in-range index value for the at least one other source register and at least one out-of-range index value for the at least one other source register. The at least one other source register stores a plurality of vector element values, wherein each in-range index value indicates which vector element value of the at least one other source register is to be stored into a corresponding vector element of the destination register. Each out-of-range index value is used to indicate which one of at least two predetermined constant values is to be stored into a corresponding vector element of the destination register. In one form a negative out-of-range index value indicates a first predetermined constant value of the at least two predetermined constant values to be stored into the corresponding vector element of the destination register. A positive out-of-range index value indicates a second predetermined constant value of the at least two predetermined constant values to be stored into the corresponding vector element of the destination register. In another form the first predetermined constant value is minus one and the second predetermined constant value is zero. In another form the at least two predetermined constant values are stored in a look-up table at a location within the look-up table corresponds to the out-of-range index value. In another form the look-up table is a hardwired look-up table stored within the data processing system. In yet another form the first source register and the destination register are a same register of the plurality of general purpose registers. In yet another form the at least one in-range index value and the at least one out-of-range value are to be stored in a temporary location prior to storing vector element values into the destination register. In yet another form each vector element of the destination register corresponds to a vector element of first source register. In yet another form the at least one other source register comprises only one register. In another form the vector element values of the at least one other source register correspond to sequential values of a look-up table. In another form there is provided a method for performing a permutation operation by providing a plurality of general purpose registers. Processor circuitry is provided for executing one or more instructions. The one or more instructions include a permutation instruction which identifies a first source register from the plurality of general purpose registers, at least one other source register from the plurality of general purpose registers, and a destination register from the plurality of general purpose registers. The first source register stores at least one in-range index value for the at least one other source register and at least one out-of-range index value for the at least one other source register. The at least one other source register stores a plurality of vector element values, wherein each in-range index value indicates which vector element value of the at least one other source register is to be stored into a corresponding vector element of the destination register and wherein each out-of-range index value is used to indicate which one of at least two predetermined constant values is to be stored into a corresponding vector element of the destination register. In one form a negative out-of-range index value indicates a first predetermined constant value of the at least two predetermined constant values to be stored into the corresponding vector element of the destination register. A positive out-of-range index value indicates a second predetermined constant value of the at least two predetermined constant values to be stored into the corresponding vector element of the destination register. In another form the first predetermined constant value is minus one and the second predetermined constant value is zero. In yet another form a look-up table is provided. The at least two predetermined constant values are stored in the look-up table at a location within the look-up table corresponding to the out-of-range index value. In another form each vector element of the destination register corresponds to a vector element of first source register. In another form the vector element values of the at least one other source register correspond to sequential values of a look-up table.

In another form there is provided a data processing system having a plurality of general purpose registers. Processor circuitry executes one or more instructions. The one or more instructions include a permutation instruction which identifies a first source register from the plurality of general purpose registers, at least one other source register from the plurality of general purpose registers, and a destination register from the plurality of general purpose registers. The first source register stores at least one in-range index value for the at least one other source register, at least one positive out-of-range index value for the at least one other source register, and at least one negative out-of-range index value for the at least one other source register. The at least one other source register stores a plurality of vector element values. Each in-range index value indicates which vector element value of the at least one other source register is to be stored into a corresponding vector element of the destination register. Each positive out-of-range index indicates a first predetermined constant value that is to be stored into a corresponding vector element of the destination register. Each negative out-of-range index indicates a second predetermined constant value to be stored into a corresponding vector element of the destination register. In one form the first predetermined constant value is minus one and the second predetermined constant value is zero. In another form each vector element of the destination register corresponds to a vector element of first source register. In yet another form the vector element values of the at least one other source register correspond to sequential values of at least a portion of a look-up table.

In another form there is provided a method for performing an extended table lookup in a data processing system having a plurality of general purpose registers. A plurality of partial table lookups is performed corresponding to an extended table to produce a plurality of intermediate results. Each of the partial table lookups is performed in response to a vector instruction, wherein the vector instruction identifies a first source register from the plurality of general purpose registers, at least one other source register from the plurality of general purpose registers, and a destination register from the plurality of general purpose registers. The first source register stores a plurality of index values, and the at least one other source register stores a plurality of table values corresponding to only a portion of the extended table. The destination register stores an intermediate result, wherein each in-range index value of the plurality of index values stored in the first source register corresponds to a particular vector element location of the at least one other source register and results in the table value stored at the particular vector element location of the at least one other source register being stored into a predetermined vector element of the destination register. Each out-of-range index value of the plurality of index values stored in the first source register does not correspond to any vector element location of the at least one other source register and results in a predetermined constant value being stored into a predetermined vector element of the destination register. A final result is formed by performing a logic function with the plurality of intermediate results. The final result is stored in the data processing system. In one form for each partial lookup of the plurality of partial lookups, the at least one other source register identified by the vector instruction stores a plurality of table values corresponding to a different portion of the extended table. In another form prior to performing a first partial table lookup of the plurality of partial table lookups, each of the plurality of index values stored in the first source register corresponds to a predetermined entry in the extended table. In another form the performing the plurality of partial lookups includes adjusting the plurality of index values between performing partial lookups. In yet another form adjusting the plurality of index values includes subtracting from each of the plurality of index values a predetermined value corresponding to a number of vector element locations of the at least one other source register. In yet another form the first source register and the destination register are a same register of the plurality of general purpose registers. In yet another form the plurality of index values are to be stored in a temporary location prior to storing vector element values into the destination register. In yet another form the predetermined constant value is zero, and the final result is formed by performing a logic function with the plurality of intermediate results by performing a logical OR of the plurality of intermediate results. In another form the predetermined constant value is one, and the final result is formed by performing a logical exclusive NOR of the plurality of intermediate results. In another form the at least one other source register is only one source register.

In another form there is provided a data processing system having a plurality of general purpose registers. A method for performing an extended table lookup includes performing a plurality of partial table lookups corresponding to an extended table to produce a plurality of intermediate results. Each of the partial table lookups is performed in response to a vector instruction, wherein the vector instruction identifies a first source register from the plurality of general purpose registers, at least one other source register from the plurality of general purpose registers, and a destination register from the plurality of general purpose registers, the first source register for storing a plurality of index values, and the at least one other source register for storing a plurality of table values corresponding to only a portion of the extended table, and the destination register for storing an intermediate result, wherein each in-range index value of the plurality of index values stored in the first source register corresponds to a particular vector element location of the at least one other source register and results in the table value stored at the particular vector element location of the at least one other source register being stored into a predetermined vector element of the destination register and wherein each out-of-range index value of the plurality of index values stored in the first source register does not correspond to any vector element location of the at least one other source register and results in a zero being stored into a predetermined vector element of the destination register. A logical OR of the plurality of intermediate results is performed to obtain a final result. The final result is stored in the data processing system. In another form for each partial lookup of the plurality of partial lookups, the at least one other source register identified by the vector instruction stores a plurality of table values corresponding to a different portion of the extended table. In another form performing the plurality of partial lookups is done by adjusting the plurality of index values between performing partial lookups. In yet another form adjusting the plurality of index values is performed by subtracting from each of the plurality of index values a number of vector element locations of the at least one other source register. In yet another form the first source register and the destination register are a same register of the plurality of general purpose registers. In yet another form the plurality of index values are to be stored in a temporary location prior to storing vector element values into the destination register. In yet another form each vector element of the destination register corresponds to a vector element of first source register.

In another form a data processing system has a plurality of general purpose registers. Processor circuitry performs a plurality of partial table lookups corresponding to an extended table to produce a plurality of intermediate results. The processor circuitry performs each of the plurality of partial table lookups in response to execution of a vector instruction. The vector instruction identifies a first source register from the plurality of general purpose registers, at least one other source register from the plurality of general purpose registers, and a destination register from the plurality of general purpose registers. The first source register stores a plurality of index values, and the at least one other source register stores a plurality of table values corresponding to only a portion of the extended table. The destination register stores an intermediate result. Each index value of the plurality of index values which corresponds to a particular vector element location of the at least one other source register causes the table value stored at the particular vector element location of the at least one other source register to be stored into a corresponding vector element of the destination register. Each index value of the plurality of index values which does not correspond to any vector element location of the at least one other source register causes a predetermined constant value to be stored into a corresponding vector element of the destination register. The processor circuitry performs a logic function with the plurality of intermediate results to obtain a final result. Storage circuitry stores the final result. In another form the predetermined constant value is zero, and the logic function is a logical OR of the plurality of intermediate results. In another form the constant value is one, and the logic function is a logical exclusive NOR of the plurality of intermediate results.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, data processing system 10 may include any number of separate integrated circuits or separate devices interconnected with each other. For example, memory 12 may be located on a same integrated circuit as processor 14 or on a separate integrated circuit or located within another peripheral or slave discretely separate from other elements of data processing system 10. Peripherals 18 and I/O circuitry 16 may also be located on separate integrated circuits or devices. Also for example, data processing system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations are merely illustrative. In some examples the functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media such as memory 12 or other media on other computer systems. Such computer readable media may be permanently, removably or remotely coupled to an information processing system such as system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

In one embodiment, data processing system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Although the invention is described herein with reference to specific embodiments, various modifications and changes can be made without departing from the scope of the present invention as set forth in the claims below. For example, various numbering formats other than hexadecimal may be used. Changes to the data processing architecture may be used. Any of a variety of known data storage circuits may be used to implement the memories and registers. The bit sizes of the data buses, registers, vector fields and data operands may be changed depending upon the application. Additionally, the values used for the predetermined constants may be changed to have other values than the ones illustrated herein. Any type of semiconductor processing technology may be used to implement the circuitry described herein. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a data processing system having a plurality of general purpose registers, a method for performing an extended table lookup comprising:
    performing a plurality of partial table lookups corresponding to an extended table to produce a plurality of intermediate results, each of the partial table lookups being performed in response to a vector instruction, wherein:
        the vector instruction identifies:
            a first source register from the plurality of general purpose registers;
            at least one other source register from the plurality of general purpose registers; and
            a destination register from the plurality of general purpose registers;
        the first source register stores a plurality of index values including at least one in-range index value for the at least one other source register and at least one out-of-range index value for the at least one other source register;
        the at least one other source register stores a plurality of table values corresponding to only a portion of the extended table;
        the destination register stores an intermediate result;
        each in-range index value of the plurality of index values stored in the first source register corresponds to a particular vector element location of the at least one other source register and results in the table value stored at the particular vector element location of the at least one other source register being stored into a first corresponding vector element of the destination register;
        each out-of-range index value of the plurality of index values stored in the first source register does not correspond to any vector element location of the at least one other source register and is in one of at least two out-of-range index value ranges that is used to indicate which one of at least two predetermined constant values is to be stored into a second corresponding vector element of the destination register; and
        performing the plurality of partial table lookups comprises adjusting the plurality of index values between performing partial table lookups by subtracting from each of the plurality of index values a predetermined value corresponding to a number of vector element locations of the at least one other source register;
    forming a final result by performing a logic function with the plurality of intermediate results; and
    storing the final result in the data processing system.

2. The method of claim 1, wherein for each partial lookup of the plurality of partial table lookups, the at least one other source register identified by the vector instruction stores a plurality of table values corresponding to a different portion of the extended table.

3. The method of claim 1, wherein prior to performing a first partial table lookup of the plurality of partial table lookups, each of the plurality of index values stored in the first source register corresponds to a predetermined entry in the extended table.

4. The method of claim 1, wherein the first source register and the destination register are a same register of the plurality of general purpose registers.

5. The method of claim 4, wherein the plurality of index values are to be stored in a temporary location prior to storing vector element values into the destination register.

6. The method of claim 1, wherein a particular predetermined constant value of the at least two predetermined constant values is zero, and wherein the forming the final result by performing a logic function with the plurality of intermediate results comprises performing a logical OR of the plurality of intermediate results.

7. The method of claim 1, wherein a particular predetermined constant of the at least two predetermined constant values value is all ones, and wherein the forming the final result by performing a logic function with the plurality of intermediate results comprises performing a logical exclusive NOR of the plurality of intermediate results.

8. The method of claim 1, wherein the at least one other source register comprises only one source register.

9. In a data processing system having a plurality of general purpose registers, a method for performing an extended table lookup comprising:
performing a plurality of partial table lookups corresponding to an extended table to produce a plurality of intermediate results, each of the partial table lookups being performed in response to a vector instruction, wherein:
the vector instruction identifies:
a first source register from the plurality of general purpose registers;
at least one other source register from the plurality of general purpose registers; and
a destination register from the plurality of general purpose registers;
the first source register stores a plurality of index values;
the at least one other source register stores a plurality of table values corresponding to only a portion of the extended table;
the destination register stores an intermediate result;
each in-range index value of the plurality of index values stored in the first source register corresponds to a particular vector element location of the at least one other source register and results in the table value stored at the particular vector element location of the at least one other source register being stored into a predetermined vector element of the destination register; and
each out-of-range index value of the plurality of index values stored in the first source register does not correspond to any vector element location of the at least one other source register and results in a zero being stored into a predetermined vector element of the destination register;
performing a logical OR of the plurality of intermediate results to obtain a final result; and
storing the final result in the data processing system;
wherein the performing the plurality of partial table lookups comprises adjusting the plurality of index values between performing partial table lookups, the adjusting the plurality of index values further comprising subtracting from each of the plurality of index values a number of vector element locations of the at least one other source register.

10. The method of claim 9, wherein for each partial table lookup of the plurality of partial table lookups, the at least one other source register identified by the vector instruction stores a plurality of table values corresponding to a different portion of the extended table.

11. The method of claim 9, wherein the first source register and the destination register are a same register of the plurality of general purpose registers.

12. The method of claim 11, wherein the plurality of index values are to be stored in a temporary location prior to storing vector element values into the destination register.

13. The method of claim 9, wherein each vector element of the destination register corresponds to a vector element of the first source register.

14. A data processing system comprising:
a plurality of general purpose registers;
processor circuitry for performing a plurality of partial table lookups corresponding to an extended table to produce a plurality of intermediate results, wherein:
the processor circuitry performs each of the plurality of partial table lookups in response to execution of a vector instruction, the vector instruction identifying:
a first source register from the plurality of general purpose registers;
at least one other source register from the plurality of general purpose registers; and
a destination register from the plurality of general purpose registers;
the first source register stores a plurality of index values including at least one in-range index value for the at least one other source register and at least one out-of-range index value for the at least one other source register;
the at least one other source register stores a plurality of table values corresponding to only a portion of the extended table;
the destination register stores an intermediate result;
each in-range index value of the plurality of index values corresponds to a particular vector element location of the at least one other source register and causes the table value stored at the particular vector element location of the at least one other source register to be stored into a first corresponding vector element of the destination register;
each out-of-range index value of the plurality of index values does not correspond to any vector element location of the at least one other source register and is in one of at least two out-of-range index value ranges that is used to indicate which one of at least two predetermined constant values is to be stored into a second corresponding vector element of the destination register; and
performing the plurality of partial table lookups comprises adjusting the plurality of index values between performing partial table lookups by subtracting from each of the plurality of index values a predetermined value corresponding to a number of vector element locations of the at least one other source register;
processor circuitry for performing a logic function with the plurality of intermediate results to obtain a final result; and
storage circuitry for storing the final result.

15. The data processing system of claim 14, wherein a particular predetermined constant value of the at least two predetermined constant values is zero, and wherein the logic function comprises a logical OR of the plurality of intermediate results.

16. The data processing system of claim 14, wherein a particular predetermined constant value of the at least two predetermined constant values is all ones, and wherein the logic function comprises a logical exclusive NOR of the plurality of intermediate results.

* * * * *